Feb. 26, 1957    F. S. BAILEY    2,783,335
ADJUSTMENT FOR POULTRY HOUSE THERMOSTATS, AND THE LIKE
Filed Oct. 16, 1953

Fred S. Bailey
INVENTOR.
BY

United States Patent Office 2,783,335
Patented Feb. 26, 1957

2,783,335

ADJUSTMENT FOR POULTRY HOUSE THERMOSTATS AND THE LIKE

Fred S. Bailey, Rock Island, Ill., assignor to American Machine and Metals, Inc., New York, N. Y., a corporation of Delaware Application October 16, 1953, Serial No. 386,427

3 Claims. (Cl. 200—140)

The present invention relates generally to thermostats for poultry house and dairy barn ventilators which are generally of rugged construction, and more particularly to a novel adjustment for both factory adjusting the device and for obtaining different temperature settings for same in use.

One object of the invention is to provide a simplified and inexpensive adjustment for thermostats which will be subject to use in dusty and very humid atmospheres, in which the parts must be rugged and simple while affording a predetermined degree of adjustment.

Other objects and advantages reside in the details of construction and arrangement of parts as set forth more fully in the following specification and claims, and shown in the drawing in which:

Figure 1:
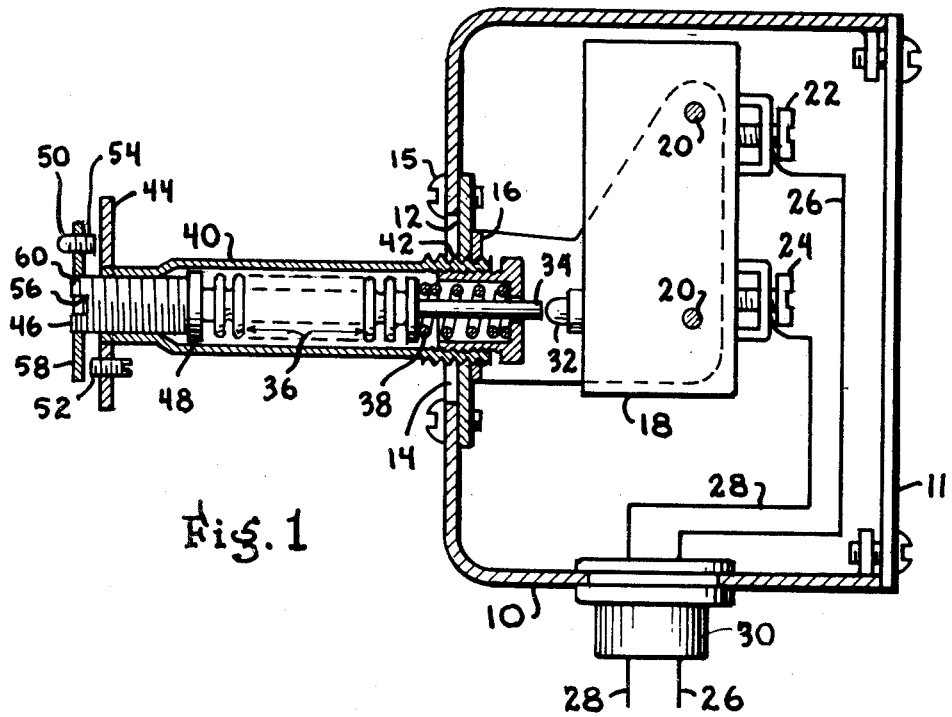
Fig. 1 is a side view with parts in section.

Referring first to Fig. 1 a case 10 may be of drawn steel and may be closed by a cover 11 suitably secured thereto. A plate 12 is secured over a hole 14 in the rear of the case 10 by screws 15. The plate 12 may have secured thereto as by soldering or welding a support or bracket 16 which in turn supports an electric switch 18 by means of screws 20. The switch may be of a conventional type such as produced by several different manufacturers and hence the details thereof will not be given. The switch 18 may have terminals 22 and 24 to which wires 26 and 28 respectively may lead through a connection 30 to a controlled device not shown, for example a ventilating fan. When the switch 18 passes current through wires 26 and 28 the device controlled may be caused to operate in a different manner than it would without the switch, or the device controlled may be an on-off device, all of which is well known in the trade and hence not here described in detail.

The switch 18 has a push button 32 which may be depressed or released by a plunger 34. The plunger 34 may be operated by any suitable means but in the structure shown is moved back and forth either by a liquid filled thermally sensitive bellows 36 which when heated causes movement of the plunger 34 toward the right and which upon cooling of the liquid in the bellows 36 causes movement towards the left due to the influence of a spring 38. Obviously other thermal elements such as a rod and tube having different thermal expansions or other sensitive elements could replace the element 36 within the spirit of the invention now to be described.

A tube or tubular housing 40 containing the spring 38 and bellows 36 is fastened to the plate 12 at point 42. The tube 40 has at its distal end a plate 44, that may be a disc if desired, which may be secured to the end of the tube as by soldering or the like. The end of the tube is threaded and as shown receives an adjustment screw 46 having an expanded end 48 which bears against the left hand end of the bellows 36. As the screw 46, which may be of right hand thread, is rotated in a clockwise manner as viewed in Fig. 2, the end 48 may be moved towards the right as viewed in Fig. 1. This will result in a lower temperature setting for the device inasmuch as the stem 34 will likewise be moved to the right by such adjustment and the thermal element will therefore operate the switch 18 at a lower temperature.

Figure 2:
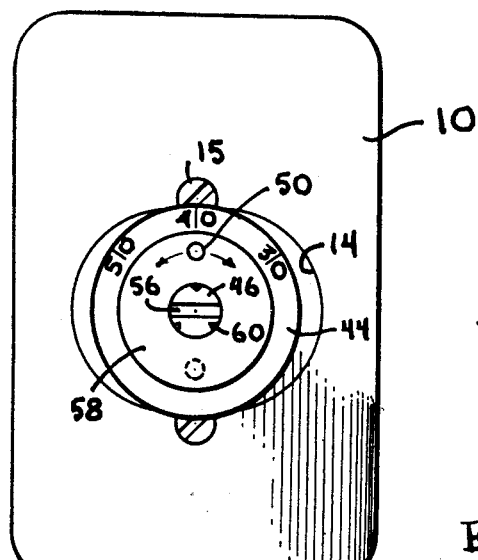
Fig. 2 is an end view looking toward the right at Fig. 1.

As viewed in Fig. 2, the disc 44 has suitable indicia thereon showing settings for 30 degrees, 40 degrees and 50 degrees, all of which are in the Fahrenheit scale in this embodiment. Accordingly, as an operating indicator 50 is moved clockwise from adjacent the character 40 toward the character 30, the device will be caused to control at a lower temperature. Conversely as the indicator 50 is moved in a counterclockwise manner the end 48 will move toward the left and the device will control at a higher temperature. A stop screw 52 is provided in the disc 44 and is adapted to engage an end 54 of the indicator 50 to prevent rotation in either direction of the pointer 50 more than a predetermined fraction of 360 degrees. By such arrangement this prevents setting of the device below a limited low value or a limited high value wherein the parts may be injured or the parts put to undesirable adjustments. In addition, it prevents the losing of an initial adjustment. Such could occur without the cooperation of these stop elements 52 and 54.

In assembling an adjusting device, the disc 44 may be secured as shown on the distal end of the tube 40. The stop screw 52 will be backed away toward the right as viewed in Fig. 1. Thereafter a screw driver or the like may be inserted into a kerf 56 of the screw 46 and the same moved so that the plunger 35 engages the switch operator 32 and causes operation thereof at a predetermined temperature, for example, 40 degrees. The screw driver in the kerf 56 may be rotated back and forth and a suitable indicator such as a light or the like controlled by current flowing in the wires 26 and 28 under the influence of the switch 18. In such position the device will be made to control around 40 degrees, for example, plus or minus the operating differential of the entire structure.

After the device is set at the proper control point, it may pass on in production at this set temperature and a plate 58 including the indicator 50 screwed onto the screw 46 until a good mechanical engagement is made and the pointer 50 is in registry with the indicia 40 on the disc 44. With the parts in this position a suitable staking tool or device may be used to stake the disc 58 to the screw 46 at a predetermined number of points 60. Thereafter, the stop screw 52 may be moved toward the left as viewed in Fig. 1 to such an extent that when the indicator 50 is moved toward the left it will engage the same and thus be stopped. Inasmuch as a right hand screw thread has been explained, when the indicator 50 is moved in a clockwise direction, the screw 46 will move inward so that engagement is assured with the stop 52. In this connection, the stop 54 should extend more than the screw pitch of the screw 46 to assure engagement and complete travel in adjustment. If it is desired to have the indicia 30, 40 and 50 read in a clockwise direction, rather than the counterclockwise direction shown, it is only necessary to change from a right hand to a left hand screw 46.

In the use of my device, it is seen that the maximum limits of travel are obtained by a stop screw 52 which is sufficiently adjustable to permit wide tolerances in manufacture, which thus contributes to inexpensiveness in my device. Further in use, the device besides being fool-proof, is rugged and so arranged that dust and the like are prevented from getting into either the switch case 10 or into the tube 40. In addition, the adjustment parts are provided with enough clearances so that even though they frost up or gather an accumulation of dirt they can be brushed clean with a suitable tool, or a screw driver or the like, which is not possible with delicate adjustment devices usually provided in thermostats.

In view of the above description, obviously modifications hereof will occur to those skilled in the art and accordingly, I wish not to be limited in my invention only to the specific form shown and described but by the scope of the appending claims.

I claim:

1. In a poultry house thermostat, or the like, in combination, a tubular housing, a push-button switch rigidly mounted in fixed relation to one end of said housing, an axially moveable temperature-responsive bellows within said housing for operating said switch, an indicia-bearing disk fixed to said housing at the other end thereof, a first stop member secured to said disk, an adjustment screw extending through said disk into and through the other end of said housing in axial alignment with and terminating at one end of said bellows, a switch-operating plunger in axial alignment with said bellows contacting the other end of said bellows and terminating adjacent the push-button of said switch, an indicator disk attached to said adjustment screw cooperable with said indicia on said disk for indicating the temperature setting and a second stop member secured to said adjustment screw and cooperable with said first stop for restricting the movement of said screw beyond desired limits for the thermostat settings.

2. In a poultry house thermostat, or the like, in combination, a case, a push-button switch rigidly mounted in said case, a tubular housing connected at one end thereof to said case, an axially moveable temperature-responsive bellows within said housing for operating said switch, an indicia-bearing disk fixed to said housing at the other end thereof, a first stop member secured to said disk, an adjustment screw extending through said disk into and through the other end of said housing in axial alignment with and terminating at one end of said bellows, a switch-operating plunger in axial alignment with said bellows contacting the other end of said bellows and terminating adjacent the push-button of said switch, an indicator disk attached to said adjustment screw cooperable with said indicia on said disk for indicating the temperature setting and a second stop member secured to said adjustment screw and cooperable with said first stop for restricting the movement of said screw beyond desired limits for the thermostat settings.

3. In a poultry house thermostat or the like, in combination, a case having an aperture in a wall thereof, a plate mountable over said aperture, a bracket attached to said plate rigidly supporting a push-button switch within said case, a tubular housing attached at one of its ends to said plate, an axially moveable liquid-filled bellows, responsive to the surrounding temperature, situated within said housing for operating said switch, an indicia-bearing disk fixed to said housing at the other end thereof, a first stop member secured to said disk, an adjustment screw extending through said disk into and through the other end of said housing in axial alignment with and terminating at one end of said bellows, a switch-operating plunger in axial alignment with said bellows contacting the other end of said bellows and terminating adjacent the push-button of said switch, an indicator disk attached to said adjustment screw cooperable with said indicia on said disk for indicating the temperature setting and a second stop member secured to said adjustment screw and cooperable with said first stop for restricting the movement of said screw beyond desired limits for the thermostat settings.

References Cited in the file of this patent
UNITED STATES PATENTS

| | | |
|---|---|---|
| 2,197,230 | Waddell | Apr. 16, 1940 |
| 2,256,732 | Brown | Sept. 23, 1941 |
| 2,288,517 | Dubilier | June 30, 1942 |
| 2,395,007 | Leupold | Feb. 19, 1946 |
| 2,637,794 | Grotenhouse | May 5, 1953 |